March 17, 1970  D. J. BRIDGEFORD  3,501,419
CELLULOSE MICROSPHERICAL PRODUCT
Filed Dec. 12, 1966  4 Sheets-Sheet 1

DOUGLAS J. BRIDGEFORD
*INVENTOR.*

BY
his attorney

DOUGLAS J BRIDGEFORD
INVENTOR.

his attorney

March 17, 1970  D. J. BRIDGEFORD  3,501,419
CELLULOSE MICROSPHERICAL PRODUCT

Filed Dec. 12, 1966  4 Sheets-Sheet 4

DOUGLAS J. BRIDGEFORD
*INVENTOR.*

BY *Neal J Mosely*
his attorney 3,501,419
CELLULOSE MICROSPHERICAL PRODUCT
Douglas J. Bridgeford, Danville, Ill., assignor to Tee-Pak, Inc., a corporation of Illinois
Continuation-in-part of applications Ser. No. 200,621, June 7, 1962, and Ser. No. 416,795, Dec. 8, 1964. This application Dec. 12, 1966, Ser. No. 601,202
Int. Cl. B01j 13/02; C08b 29/16
U.S. Cl. 260—2.5                                    5 Claims

ABSTRACT OF THE DISCLOSURE

A hollow microspherical product consisting of a regenerated polymeric alcohol, such as cellulose, starch, amylose, polyvinyl alcohol, polyallyl alcohol, etc., is produced by spray drying a solution of a polymeric alcohol xanthate under temperature conditions which effect a regeneration of the polymeric alcohol from the xanthate. A preferred embodiment utilizes solutions of polymeric alcohol xanthates which have been decausticized, as by dialysis, dilute or weak acid neutralization, cation exchange, or anion exchange, under conditions which do not regenerate the polymeric alcohol from the xanthate, as a feed in the spray drying process. The use of decausticised solutions avoids the depolymerization of the polymeric alcohol which may result from the presence of excess alkali during the spray drying process. The small hollow spheres of various regenerated polymeric alcohols, ranging in size from a fraction of a micron up to several hundred microns in diameter, are disclosed as novel products. A variety of uses are disclosed for these small hollow spheres, including the use as pigments or opacifiers, either alone or in admixture with a dye or pigment, fillers in paper compositions, encapsulation of dyes and other materials, ion exchange beads, catalyst supports, precursors for the preparation of graphite in hollow spherical form, components of insulating board, filler for molded plastic articles of extremely low density, etc.

CROSS REFERENCE TO RELATED APPLICATIONS

This application is a continuation-in-part of the co-pending applications of Douglas J. Bridgeford, Ser. No. 200,621 filed June 7, 1962, now U.S. Patent 3,291,789 and Ser. No. 416,795 filed Dec. 8, 1964, now U.S. Patent 3,399,069.

BACKGROUND OF THE INVENTION

Viscose has been known as an intermediate in the preparation of cellulose compositions for about 70 years. Cellulose xanthate was discovered by Cross and Bevan in 1892 and is prepared by the reaction of carbon disulfide with alkali cellulose. A dilute aqueous alkaline solution of cellulose xanthate is known as viscose and consists of a mixture of sodium cellulose xanthates of varying molecular size, loosely combined with sodium hydroxide and dispersed in the solution together with alkalization and xanthation by-products.

In commercial production, viscose is allowed to age until it reaches the desired ripeness and is then extruded through a die into a coagulating and/or regenerating medium (e.g. ammonium sulfate and/or sulfuric acid) to regenerate cellulose having the configuration of the die through which the viscose was extruded. If the viscose is extruded through a fine hole a filament of rayon is produced. If the viscose is extruded through a narrow slit, a film of regenerated cellulose is produced. If the viscose is extruded through a thin annular opening a tubular film of regenerated cellulose is produced which may be used as an artificial sausage casing. Viscose has also been used for impregnating paper or fabric (including non-woven fabrics and webs) for regenerating cellulose therein by subsequent treatment with acid.

Attempts have also been made to regenerate viscose thermally to avoid the necessity for acid resistant equipment which is required in acid regeneration processes. The acid regeneration of viscose and the thermal regeneration of viscose both result in the formation of large amounts of salts and other undesirable by-products similar in weight to the cellulose which necessitate extensive washing and purification of the regenerated cellulose.

Polymeric alcohols, including carbohydrates and polysaccharides, such as starch, amylose, dextran, sugars, polyvinyl alcohol, polyallyl alcohol, etc., are known to form alkali derivatives from which the corresponding xanthates can be prepared by reaction with carbon disulfide. The purification of these materials and regeneration of products therefrom present economic and technical problems which are similar to the purification and regeneration of cellulose from viscose.

In my co-pending patent application, Ser. No. 200,621, filed June 7, 1962, there are described several inexpensive processes for decausticizing various polymeric alcohol xanthates. In that patent application there are described processes in which alkaline solutions of various polymeric alcohol xanthates are decausticized by dialysis or by treatment with ion exchange or ion retardation materials.

Solutions of polymeric alcohol xanthates which have been decausticized as described in my prior co-pending patent application are especially useful as wet and dry strength additives for paper and for various other purposes as described in said application. Decausticized polymeric alcohol xanthate solutions can be regenerated into films or filaments or tubular casings by treatment with acid and/or by thermal regeneration. These decausticized solutions, however, contain such a high proportion of water that it has been uneconomical to manufacture such solutions for commercial use at any location other than the place at which the xanthate solution was prepared. Also, it has been found that decausticized xanthate solutions tend to decompose, lose xanthate sulfur, and gradually become insoluble after storage for extended periods of time. The decomposition of the xanthate groups is accelerated at higher temperatures. It has thus been necessary to refrigerate decausticized polymeric alcohol xanthate solutions if they are to be stored for any extended period of time.

While the decausticized polymeric alcohol xanthate solutions described in my co-pending patent application are useful for a variety of purposes, the problems of storage and cost of shipping excessive amounts of water have retarded the commercial use of these materials. It has been considered highly desirable to find some economic means to convert these materials into a dry, solid form which is stable for extended periods of storage and which can be reconstituted by mixture with or dispersion in water or other solvent.

In my co-pending patent application Ser. No. 416,795 filed Dec. 8, 1964, I describe a process wherein decausticized solutions of polymeric alcohol xanthates, such as cellulose, starch, dextran, sugars, polyvinyl alcohol, polyallyl alcohol, etc., are converted to finely divided, solid, stable products by spray drying The decausticized solutions (which have been decausticized to a pH less than 13) are subjected to spray drying using a large volume of very dry heated air, at a temperature of at least 38° C. to produce a powdered polymeric alcohol xanthate product which is substantially dry and has a D.S. of at least 3%.

The term D.S. as used herein refers to the degree of substitution of the polymeric alcohol expressed as a percentage of available groups capable of substitution which are in fact substituted with the xanthate radical. Thus, a polyvinyl alcohol xanthate having a xanthate group for every ten vinyl groups would have a D.S. of 10%. A cellulose xanthate, however, containing one xanthate group for every ten anhydroglucose groups would have a D.S. of 3⅓% because cellulose can contain up to three xanthate substituents per anhydroglucose unit.

I have found that the dry decausticized xanthate powders which can be prepared in this manner can be dissolved or dispersed in water and other solvents or swell sufficiently upon admixture with water to be useful as additives in the formation of paper webs.

It was most unexpected that decausticized xanthate solutions could be spray dried. Viscose is much more stable on extended storage, both at low and elevated temperatures, than is a solution of decausticized cellulose xanthate of the same cellulose contents. I have found that viscose, however, to be extremely unstable in spray drying. In fact, viscose loses most of its xanthate groups during spray drying and yields a substantially insoluble product. The sodium hydroxide present in viscose is quite damaging to the dried product. Sodium hydroxide is somewhat hygroscopic and thus more water is retained (making the product less stable) in spray dried viscose. Also, the sodium hydroxide present in spray dried viscose attacks cellulose and depolymerizes it.

The spray drying of decausticized polymeric alcohol xanthates can be accomplished using any of the several types of spray dryers which are in commercial use. Spray dryers which can be used in this process include the mixed flow type, horizontal-concurrent type, vertical up flow counter-current type, vertical down flow concurrent type, and vertical up flow concurrent type, although other commercial spray dryers can be used. In the spray drying of decausticized xanthate solutions, the solution is sprayed into a large volume high velocity stream of heated air or other inert gas. Air temperatures of at least 38° C. are required for effective drying and temperatures of the order of 260° C. can be used without excessive decomposition of the product. In fact, with proper adjustment of air flow rates and efficient product collection, it is possible to use air temperatures as high as 316° C. to 420° C.

In the course of the work done on spray drying decausticized polymeric alcohol xanthate solutions it was found that when excessive temperatures were used or when solutions were sprayed which had too high an alkali content the xanthates were decomposed and a product was obtained which consisted of relatively small hollow spherical particles of the various regenerated polymeric alcohols, viz. cellulose, amylose, etc. This product is new and unreported in the literature and has been found to have a variety of uses as hereinafter set forth.

OBJECTS AND FEATURES OF THE INVENTION

It is therefore one object of this invention to provide a new and improved process for preparation of regenerated polymeric alcohols in the form of small hollow spherical particles.

Another object of this invention is to provide a finely divided solid particulate product comprising small hollow spheres of regenerated polymeric alcohols.

Still another object of this invention is to provide novel products containing as a component small hollow spheres of regenerated polymeric alcohols.

A feature of this invention is the provision of a new and improved process for the preparation of particulate regenerated polymeric alcohols by spray drying solutions of polymeric alcohol xanthates at temperatures sufficient to effect regeneration of the polymeric alcohol.

Another feature of this invention is the provision of a novel composition comprising regenerated polymeric alcohols in the form of small hollow spheres.

Still another feature of this invention is the provision of a novel composition containing small hollow spheres of regenerated polymeric alcohols.

Other objects and features of this invention will become apparent from time to time throughout the specification and the claims as hereinafter related.

SUMMARY OF THE INVENTION

It has been found that solutions of polymeric alcohol xanthates, such as cellulose, starch, amylose, dextran, sugar, polyvinyl alcohol, polyallyl alcohol, etc., can be converted into regenerated poymeric alcohols in the form of small hollow spheres by drying at temperatures sufficient to effect a decomposition of the xanthate. The solutions which are spray dried may be the ordinary caustic containing solutions. The presence of caustic tends to accelerate the decomposition of the xanthate during spray drying but has the disadvantage of tending to depolymerize the polymeric alcohol. If the solution of polymeric alcohol xanthate is decausticized, as by dialysis, dilute acid or weak acid neutralization, cation exchange, anion exchange, etc., to a pH less than about 13 prior to spray drying, the hollow spherical particles of regenerated polymeric alcohols which are produced are contaminated with less by-product materials and do not contain excess alkali which tends to degrade the polymers. The xanthate solutions, either in the caustic or decausticized form, may be spray dried to produce hollow spheres of the xanthate. The hollow spheres of xanthate or of regenerated alcohol are washed, preferably with acid, to remove alkali and by-products. The term "hollow spheres" as used herein includes fragments of hollow spheres (i.e. broken spheres) and hollow particles of approximately spherical form. It has been found that dyes and pigments may be incorporated in the solutions of polymeric alcohol xanthates prior to spray drying so that the hollow spherical particles that are produced by the spray drying processes are colored or pigmented. The hollow spherical particles which are produced, both the unpigmented and the pigmented types, are useful in coating compositions for paper and in paper compositions for producing paper products of extremely low density. The hollow spherical particles, both with and without pigments or dyes incorporated therein, may be used as opacifiers or as pigments in coatings and in plastic films. The hollow spherical particles can be used to encapsulate dyes and other materials and can be impregnated with reactive materials for use as ion exchange beads or with catalyst materials for use as a catalyst support. The hollow spherical particles can be used as fillers to produce insulating board or to produce molded plastic articles of low density. Also, the hollow spherical particles can be decomposed thermally to produce graphite particles of hollow spherical form.

BRIEF DESCRIPTION OF THE DRAWINGS

In the accompanying drawings to be taken as a part of this specification, there are clearly and fully illustrated several examples of spray drying processes and/or apparatus which may be used in producing the novel products and compositions of this invention and several examples of the novel products of this invention, in which drawings.

DESCRIPTION OF SPRAY DRYING APPARATUS

Figure 1:
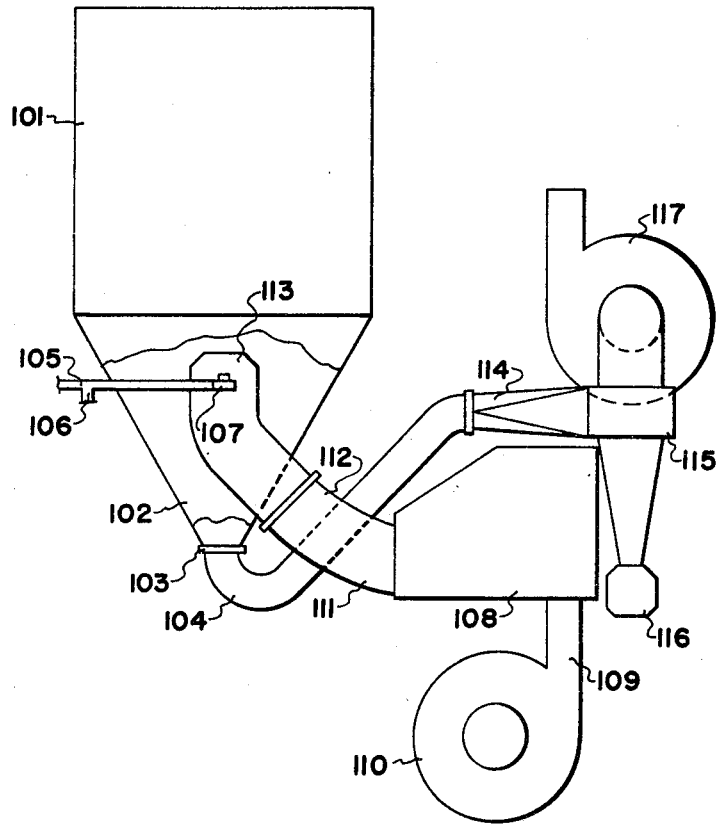
FIG. 1 is a diagrammatic view of a concurrent or parallel flow, up-flow type spray dryer.

In FIG. 1 there is shown a spray dryer which is supplied with the liquid to be dried from a pressure tank (not shown). The spray dryer includes drying chamber 101 having a conical outlet portion 102 opening through an outlet 103 to a collection conduit 104. The liquid feed is introduced into the dryer through inlet conduit 105 which is provided with inlet 106 for introduction of air or other gas to atomize the feed. Conduit 105 terminates at spray nozzle 107 in the dryer.

The dryer apparatus is provided with an air heater and filter 108 having inlet 109 connected to air supply fan 110 and an outlet 111 connected to conduit 112 which terminates at 113 in the dryer to provide a flow of heated air over the atomized solution which is to be dried.

Outlet conduit 104 from the base of the dryer is connected at 114 to cyclone collector 115 which separates the dried powdered product from the air stream. Cyclone collector 115 is provided at its lower end with a product collection reservoir 116 and at its upper end is connected to exhaust fan 117.

The solution which is to be dried is placed in a supply tank from which it is forced under pressure to atomizing nozzle 107 in the dryer. A high pressure stream of air is introduced through inlet connection 106 and mixes with the solution in the atomizing nozzle. The air stream is effective to eject the solution in the form of a hollow cone shaped mist. The production rate of the apparatus is controlled by variation in pressure of the liquid feed and air streams.

Inlet fan 110 supplies air at room temperature (which may be predried) through filter and heater 108 which raises the air temperature to a value sufficient to dry the product being handled and decompose the xanthate as will be subsequently described. The temperature of the air may range from 100° C. up to 450° C. or higher. The heated air is supplied through air inlet nozzle 113 in a blast which completely surrounds the cone shaped spray of liquid being treated. The atomized solution is carried upward in the drying chamber as a fine mist inside the blast of heated air.

As the cone shaped mist of solution mixes with the blast of hot air, the moisture is evaporated from the individual droplets. This evaporation of moisture causes the heated air stream to be cooled and maintains the surface temperature of the individual droplets at a level not substantially in excess of the wet bulb temperature of the air stream until substantially all of the moisture is evaporated from the product. The solid product in the spray is in the form of finely divided hollow spherical particles, produced by internal vapor pressure within the liquid particles during drying and is decomposed from the xanthate to the regenerated alcohol by the hot air stream after substantially all of the water is evaporated. The apparatus is operated at an air temperature such that the outlet air temperature is substantially above the decomposition point of the xanthate solution being dried. This insures that the hollow spherical particles which are produced are maintained at a temptrature above the decomposition point of the xanthate for a time sufficient to effect a substantially complete regeneration of the cellulose or other polymeric alcohol.

The finely divided solid product and air are withdrawn from the drying chamber 101 through bottom outlet 103 and conduit 104. The air and product mixture passes into cyclone collector 115 where the solid product is separated and collected in product collection receptacle 116. The air stream from cyclone collector 115 is withdrawn by exhaust fan 117 and discharged to atmosphere.

Figure 2:
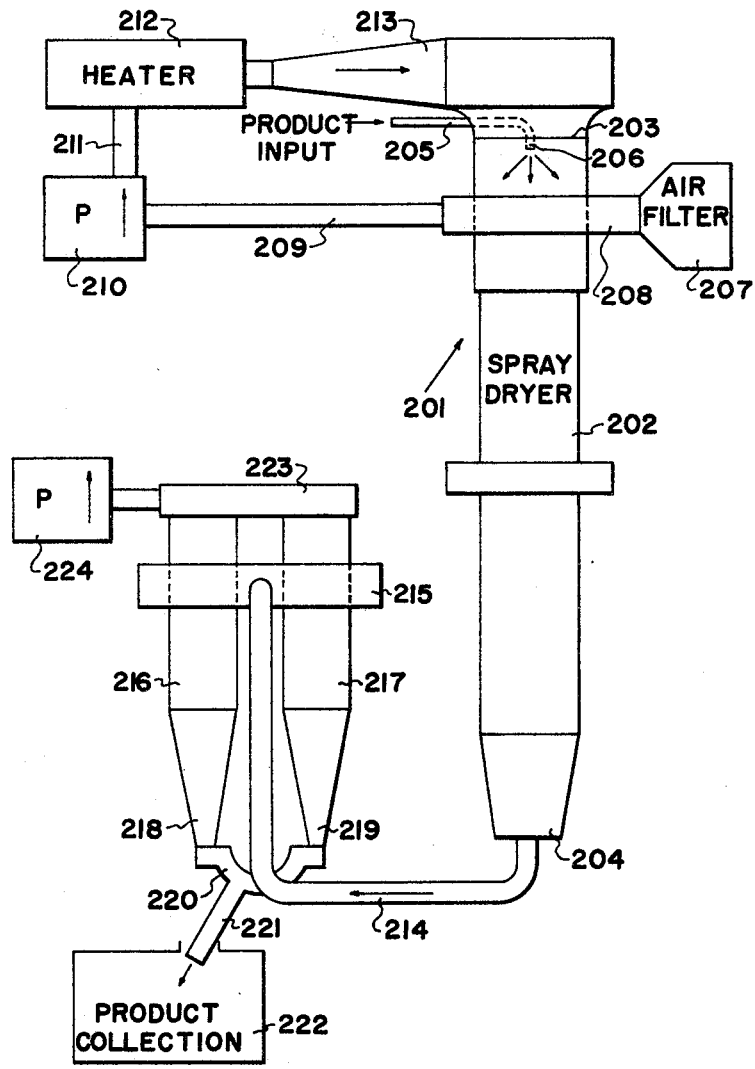
FIG. 2 is a diagrammatic view of a down-flow type, parallel flow spray dryer used in drying various xanthate solutions in accordance with this invention.

In FIG. 2 there is shown a spray dryer apparatus of a commercial type which is used for large scale production of various spray dried food products and which is particularly useful in the preparation of hollow spherical particles of regenerated polymeric alcohols such as cellulose and the like. In FIG. 2 there is a diagrammatic showing of a spray dryer 201 comprising tubular chamber 202 having an upper inlet portion 203 and a lower outlet portion 204. A solution which is to be spray dried is introduced through conduit 205 and sprayed into the upper end of chamber 202 by an atomizing nozzle 206. Air for the spray dryer is supplied through filter 207 and manifold 208 surrounding the upper end of dryer chamber 202. Manifold 208 is connected by conduit 209 through blower 210. Blower 210 is in turn connected by conduit 211 to heater 212 which supplies heated air to the inlet 213 of spray dryer 201.

The bottom outlet 204 of spray dryer 201 is connected by conduit 214 to manifold 215 which feeds twin cyclones 126 and 217. Cyclones 216 and 217 have outlets 218 and 219 connected to manifold 220 and conduit 221 leading to a product collection receptacle 222. The upper end of cyclones 216 and 217 are connected to manifold 223 which is connected to blower 224 discharging to atmosphere.

The solution being treated is introduced into spray dryer 201 through conduit 205 and atomizing nozzle 206. The solution is discharged in the form of a conical spray of very fine droplets. Air is supplied by blower 210 and is filtered (and predried, if desired) and heated prior to introduction into spray dryer. The air is supplied at any suitable drying temperature in the range from about 100° C. up to 500° C. or higher. In the spray dryer the atomized particles of solution are quickly dried into small particles of hollow spherical form. The evaporation of water (or other solvent) from the solution keeps the surface temperature of the dried particles at a value not substantially in excess of the wet bulb temperature of the heated air until the particles are substantially completely dried. As in the previously described apparatus, the air temperature drop through the apparatus is maintained at a level such that the spray dried particles are exposed to a temperature high enough and for a time long enough to effect a substantially complete regeneration of the cellulose or other polymeric alcohol in the form of small hollow spherical particles.

The flow of air and dried particulate product passes through conduit 214 into cyclones 216 and 217 where the product particles are separated and collected into receptacle 222. The air is then discharged to atmosphere through top or blower 224.

In FIGS. 2 to 7 of the drawings, there are shown examples of a number of different types of spray dryers which can be used in carrying out this invention.

Figure 3:
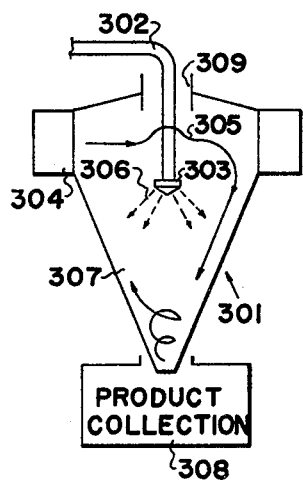
FIG. 3 is a diagrammatic view of a mixed-flow type spray dryer which can be used in drying various xanthate solutions in accordance with this invention.

In FIG. 3 there is shown a mixed-flow spray dryer 301. In this type of dryer, the solution to be treated is fed through conduit 302 and sprayed into the dryer through atomizing nozzle 303.

The feed flows countercurrently to the air and partial drying occurs while the spray mixes with the drying gases. Heated air (which may be predried) is fed into the dryer through inlet 304 and follows the path of the line and arrow 305. The flow path of atomized solution is shown by dotted lines and arrows 306.

Spray dryer 301 is constructed with the bottom portion 307 constructed as a separator and discharging to a product collection receptacle 308. The air is withdrawn through outlet 309 after separation from the solid particulate product.

In this type of dryer the initial flow of the atomized solution is concurrent to the inlet air and countercurrent to the exhaust flow of the air. Part of the drying takes place while the spray is passing through the ascending exhaust air and the drying is completed while the spray travels concurrently with the descending heated inlet air. The outlet air temperature of this type of dryer is in most cases considerably lower than for other types of dryers which increases the efficiency of treatment of thermally sensitive materials.

Figures 4, 5:
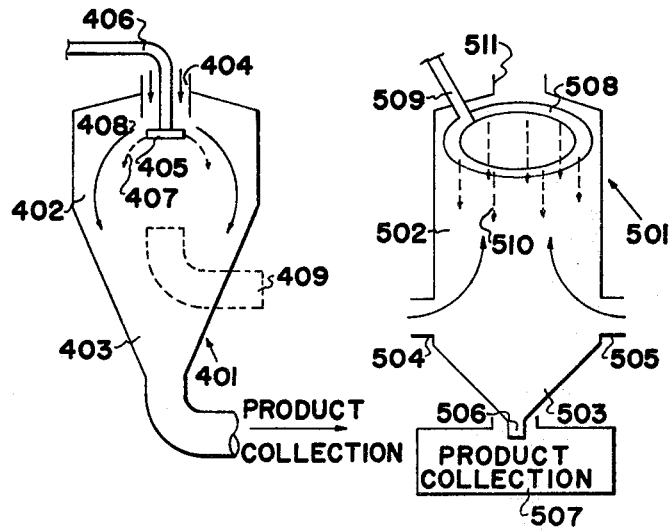
FIG. 4 is a diagrammatic view of another type of vertical, down-flow concurrent spray dryer.
FIG. 5 is a diagrammatic view of a vertical, up-flow counter-current type spray dryer.

In FIG. 4 there is shown a vertical down-flow concurrent type spray dryer. The dryer 401 has a main dryer portion 402 and a product collection portion 403 discharging to a product reservoir. Heated air (which may be predried) is introduced into dryer 401 through inlet 404 and flows past a spray of solution to be dried. The spray of solution is ejected at right angles to the air flow through nozzle 405 which is supplied by conduit 406 from the solution supply tank. The spray of solution being treated is shown by dotted lines and arrows 407 while the general path of heated air flow is shown by solid lines and arrows 408.

The heated air envelops the spray of material being dried and causes water to evaporate rapidly to produce a finely divided dried product. The solid product is removed in the separation portion of the dryer and the air is withdrawn from the dryer through outlet conduit 409 shown in dotted lines.

In FIG. 5 there is shown a vertical up-flow countercurrent type of spray dryer. Dryer 501 includes a dryer portion 502 and a collector portion 503. Dryer 501 is divided with inlets 504 and 505 for supplying heated air (which may be predried) countercurrently to the spray of liquid being treated. The collector portion 503 has an outlet 506 discharging into a product collection receptacle 507.

At the upper end of dryer 501 there is provided an atomizing nozzle 508 having a supply inlet conduit 509. Nozzle 508 is arranged to discharge a plurality of atomized streams of liquid as shown by dotted lines and arrows 510. At the upper end of the dryer there is provided an outlet opening 511 for withdrawal of gases from the dryer.

The vertical up-flow countercurrent type of dryer is quite efficient in drying but results in product classification. The larger particles which are dried by the air circulating through the dryer fall to the bottom of the chamber and are withdrawn into the product collection receptacle. Very fine particles are carried out through outlet 511 and require separation in a secondary separation system (not shown).

Figure 6:
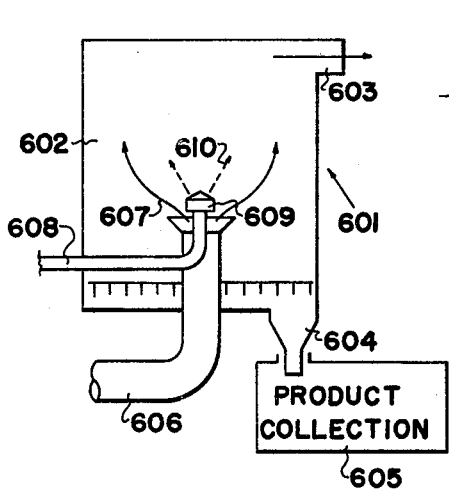
FIG. 6 is a diagrammatic view of a vertical, up-flow concurrent type spray dryer.

In FIG. 6 there is shown a diagrammatic view of a vertical up-flow concurrent type of spray dryer. In this apparatus dryer 601 comprises dryer chamber 602 having outlet 603 for discharge of air and outlet 604 discharging to a product collection receptacle 605.

Heated air (which may be predried) is introduced through conduit 608 and atomized at nozzle 609 as shown by dotted lines and arrows 610.

In this type of dryer both the air and the atomized liquid to be treated enter at the bottom of the chamber. The liquid is sprayed in a form of a hollow cone which is enveloped by the heated air flowing through the dryer. The air is maintained at a temperature ranging from 100° C. up to 500° C. or higher, depending upon the product being treated. The up-flow of air results in product classification as the large particles fall to the bottom of the chamber and are removed to product collection receptacle 605 while the product fines are withdrawn with the air through outlet 603. This arrangement requires the use of a secondary separator system for recovery of product fines and to prevent air pollution.

Figure 7:
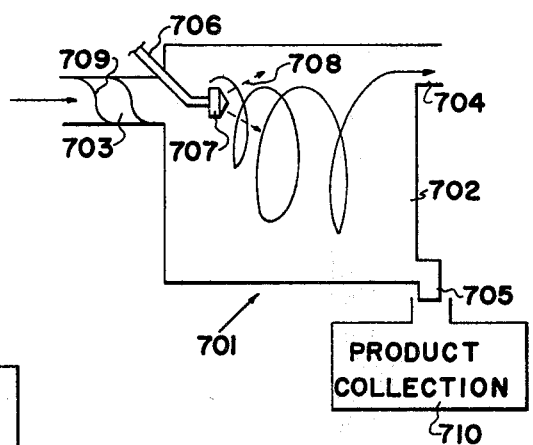
FIG. 7 is a diagrammatic view of a horizontal concurrent type spray dryer.
Figure 8:
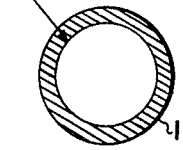
FIG. 8 is an enlarged view in cross section of a hollow spherical particle of a regenerated polymeric alcohol, such as cellulose or the like, produced in accordance with this invention.

In FIG. 7 there is shown diagrammatically a horizontal concurrent type of spray dryer. Spray dryer 701 includes dryer chamber 702 having air inlet 703 and outlet 704 and product outlet 705.

The liquid being treated is introduced into the dryer through conduit 706 which atomizes the liquid through nozzle 707 in the form of a conical spray as indicated by dotted lines and arrows 708. The heated air (which may be predried) is introduced through inlet 702 and given a whirling motion by helical vanes 709.

In this type of dryer the liquid spray and air enter concentrically at the same end of the chamber. The air circulates around the spray of liquid particles in a whirling motion caused by helical vanes 709. The particles are quickly dried and settle to the bottom of the dryer where they are removed to the product collection receptacle 710. The air is withdrawn from the dryer through outlet 704. In this type of dryer the very fine product particles are carried out with the air and require a secondary separation system (not shown).

In each of the various spray dryer apparatus described above, the temperature and air velocities may be set at the values indicated in D. J. Bridgeford patent application Ser. No. 416,795 to produce small hollow spherical particles of polymeric alcohol xanthates. These hollow spherical particles of polymeric alcohol xanthates can then be converted to particles of the corresponding regenerated polymeric alcohol by treatment with acid to decompose the xanthate or by a separate thermal treatment.

The following non-limiting examples are illustrative of several embodiments of this invenion:

Example 1

A commercial viscose solution is purified by a batch dialysis technique and converted to a dry, stable powder by spray drying.

The viscose used is a commercial viscose solution, ripened, and ready for extrusion and containing about 8% cellulose, 6.6% total alkali (total of free sodium hydroxide and combined sodium in the cellulose xanthate), 1.10% xanthate sulfur, and having a D.P. of about 500 (D.P. is the degree of polymerization and represents the average number of anhydroglucose groups per cellulose molecule).

The viscose is diluted to a 4% cellulose content and 600 ml. of the dilute viscose is placed in a bag of regenerated cellulose film. The dialylsis bag which is used in this example consists of a 72 in. length of 0.8 in. diameter tubing of regenerated cellulose film, tied at both ends. The bag of diluted viscose is placed in a 9-liter bottle and the bottle filled with distilled or deionized water. The bottle is shaken for about 20 min. at 15° C. on an Eberbach shaker at 150 cycles per min. The water is decanted and the bottle again filled with fresh water and shaken for a 1-hr. period at 15° C. After two additional changes of water the dialysis is complete.

At this point, the dialyzed viscose is removed from the bag and diluted to a 2% cellulose content to produce a viscous liquid having a pH of 11.

The dialysis procedure is repeated several times until 5 gallons of 2% cellulose content, decauticized (pH 11), viscose is obtained. The decauticized viscose is fed through a mixed flow spray dryer as shown in FIG. 3. The solution is atomized into the dryer and contacted with a high velocity heated air. In this drying operation the air inlet temperature is 130° C. and the air outlet temperature is 60° C. The rapid drying of the atomized droplets of decausticized viscose results in the production of a dry powder having a water content less than 5%. The individual particles are in the form of hollow spheres and range from submicron size up to a few balloons of 30 to 60 microns in diameter. The average size of the hollow spheres is about 10 microns.

The small spherical particles which are obtained are washed in dilute sulfuric acid (other acids may be used) to decompose the cellulose xanthate. The reaction is very rapid and the particles are converted to hollow spheres of regenerated cellulose in a very short time, viz. 30 seconds to 3 or 4 minutes, depending upon the acid concentration. The regenerated cellulose spheres are washed to remove by-products and dried in preparation for further use as hereinafter described. The regenerated cellulose spheres are useful as opacifiers for paper compositions, as catalyst supports, as precursors for the formation of hollow graphite spheres, for incorporation into insulating board or as a filler for molded plastic articles to give a low density product.

Example 2

A commercial viscose solution is purified by a batch dialysis technique and converted to a dry, stable powder by spray drying.

The viscose used is a commercial viscose solution, ripened, and ready for extrusion and containing about 8% cellulose, 6.6% total alkali (total of free sodium hydroxide and combined sodium in the cellulose xanthate), 1.10% xanthate sulfur, and having a D.P. of about 500 (D.P. is the degree of polymerization and represents the average number of anhydroglucose groups per cellulose molecule).

The viscose is diluted to a 4% cellulose content and 600 ml. of the dilute viscose is placed in a bag of regenerated cellulose film. The dialysis bag which is used in this example consists of a 72 in. length of 0.8 in. diameter tubing of regenerated cellulose film, tied at both ends. The bag of diluted viscose is placed in a 9-liter bottle and the bottle filled with distilled or deionized water. The bottle is shaken for about 20 min. at 15° C. on an Eberbach shaker at 150 cycles per min. The water is decanted and the bottle again filled with fresh water and shaken for a 1-hr. period at 15° C. After two additional changes of water the dialysis is complete.

At this point, the dialyzed viscose is removed from the bag and diluted to a 2% cellulose content to produce a viscous liquid having a pH of 11.

The dialysis procedure is repeated several times until 5 gallons of 2% cellulose content, decauticized (pH 11), viscose is obtained. The decauticized viscose is fed through a mixed flow, flow spray dryer as shown in FIG. 3. The solution is atomized into the dryer and contacted with a high velocity heated air. In this drying operation the air inlet temperature is 200° C. and the air outlet temperature is 110° C. The rapid drying of the atomized droplets of decausticized viscose results in the production of a dry powder having a water content less than 5%. The individual particles are in the form of hollow spheres and range from submicron size up to a few balloons of 30 to 60 microns in diameter. The average size of the hollow spheres is about 10 microns. At the temperatures utilized in the spray dryer the droplets of decausticized viscose are first converted into hollow spherical particles of sodium cellulose xanthate and are then thermally regenerated to hollow spherical particles of regenerated cellulose. The temperatures utilized in the dryer are selected to give the desired degree of drying and xanthate decomposition. The temperatures used are interrelated with the air velocities and so can not be expressed precisely. In general, temperatures can be used, at appropriate air velocities, ranging from 100° C. up to 500° C. or higher. The upper limit of temperature is that at which the cellulose itself begins to decompose.

The regenerated cellulose spheres which are produced in this process are washed to remove by-product materials, e.g. sodium trithiocarbonate, and redried. The cellulose spheres may be used for any of the purposes previously mentioned. It should be noted that this process involves the continuous spray drying of viscose to produce hollow microspheres of sodium cellulose xanthate and the thermal regeneration of those microspheres to produce cellulose microspheres. The thermal regeneration in this process is a part of the spray drying operation. It would be possible, of course, to treat the cellulose xanthate microspheres produced in Example 1 thermally to regenerate the cellulose therein instead of subjecting the spheres to an acid treatment.

Example 3

In this and subsequent examples, the preparation of various spray dried polymeric alcohol xanthates is described.

A high purity amylose (derived from corn) containing about 10% water and having a D.P. of about 700–900 is used in the formation of an alkali amylose xanthate solution similar to viscose.

An alkaline solution of 24% concentration (1580 g. water and 300 g. sodium hydroxide) was prepared and mixed with 300 ml. methanol and 150 g. amylose. The slurry which was formed was stirred for 10 min. and 200 ml. additional methanol added, and the more dilute slurry stirred for 1 hr. at 25° C. At that time, 5.1 liters of methanol were added to precipitate and shrink the amylose. The supernatant layer was decanted and found to contain 270 g. of sodium hydroxide. The gel which remained was allowed to dry in thin layers and to depolymerize or age.

The alkali amylose which was produced was dried and aged for 43 hrs. at 25° C. to permit the preparation of relatively high concentration alkaliamylose xanthate solutions. The gel weight was about 870 g. and comprised 12.6% alkali, 16% amylose, and 71% water.

The alkali amylose (870 g.) was spread on the bottom and on the porcelain plate of a 12 in. vacuum desiccator. Nitrogen purging was carried out and a vacuum was then applied. About 70 g. of carbon desulfide was drawn into the desiccator and the system allowed to stand in a water bath at 25° C. After about 5.25 hrs., the alkali amylose had turned to a carrot yellow-orange color. The vacuum was applied to the desiccator to remove excess carbon disulfide for a period of about 20 min. The product obtained consisted of 898 g. of sodium amylose xanthate. This material was refrigerated at −20° C. for 6 days before solutions were prepared from it.

A solution was prepared by mixing the sodium amylose xanthate with an equal weight of water for 2 hrs. using a 2½ in. marine type propeller as an agitator. The mixture was maintained at a temperature less than 15° C. during solution. The viscous xanthate solution was filtered through a muslin filter cloth and had a 6% alkali content (both free sodium hydroxide and combined sodium) and 8% amylose.

The amylose xanthate solution was diluted to a 2% amylose content and was decausticized by dialysis. The dialysis was carried out using the procedure described in Example 1 and produced a decausticized solution having a pH of 11.5.

A 2% decausticized solution of amylose xanthate, prepared as described above, is fed to a down-flow countercurrent-type spray dryer as described and shown in FIG. 5 of the drawings. The amylose xanthate solution is sprayed into the dryer counter-currently to the flow of heated air. The air has an inlet temperature of 149° C. and an outlet temperature of 104° C. The air stream passing out from the dryer is passed through a secondary separation system for recovery of fines which are combined with the coarser product removed from the bottom of the spray dryer. The product which is produced consists of a stable, dry, solid comprising essentially decausticized sodium amylose xanthate. The product consists of very small, hollow spheres ranging from submicron size up to balloons in the range of 30 to 60 microns in diameter and has an average particle size in the range of 5 to 20 microns.

When the hollow spheres of dry decausticized sodium amylose xanthate are treated with dilute sulfuric acid or hydrochloric acid (other acids may be used) the product is rapidly converted to regenerated amylose. The small spheres of regenerated amylose are generally useful for the same purposes indicated for the spheres of regenerated cellulose in the other examples. The spheres of regenerated amylose are preferably washed to remove by-products and then redried.

This procedure may be modified as in Example 2 by raising the air temperature in the dryer. When the air temperature is raised and the air flow is adjusted so that the inlet temperature is about 220° C. and the outlet temperature about 110° C. the product recovered directly from the spray dryer consists of small hollow spheres of regenerated amylose. These spheres are washed to remove by-product sodium thiocarbonate and some alkali and are then dried in preparation for use.

Example 4

In this example, dilute sodium polyvinyl alcohol xanthate is decausticized and converted to a dry stable powder.

The sodium polyvinyl alcohol xanthate used in this example is prepared in accordance with the procedure of B. G. Ranby, described in Die Makromolekulare Chemie, November 1960, p. 68 ff. The sodium polyvinyl alcohol xanthate is diluted to a 2% polyvinyl alcohol content and purified by dialysis following the procedure described in Example 1. The dialyzed solution is a viscous liquid of pH 11.

The decausticized solution of sodium polyvinyl alcohol xanthate is then passed through a concurrent up-flow spray dryer as described and shown in FIG. 6. The solution is atomized into the dryer into a stream of heated air. The air has an inlet temperature of about 163° C. and an outlet temperature of 104° C. Under these conditions the spray is converted to a finely-divided dry powder and recovered in the product collection system.

The sodium polyvinyl alcohol xanthate powder consists of hollow spherical articles ranging from submicron size to balloons having diameters of the order of 30 to 60 microns. When the hollow spherical particles of sodium polyvinyl alcohol xanthate are treated with acid as described in the previous examples the particles are quickly converted to regenerated polyvinyl alcohol (the polyvinyl alcohol used in this example is of a sufficiently low D.S. to be insoluble in water).

As in the previous examples, the operation of the spray dryer may be modified by increasing the air temperature to regenerate polyvinyl alcohol directly in the drying process. If the dryer is operated at an air inlet temperature of about 210° C. and an outlet temperature of about 120° C. the product recovered directly from the dryer consists of small hollow spherical particles of regenerated polyvinyl alcohol. The polyvinyl alcohol spheres are preferably washed to removed alkali and sodium thiocarbonates. The small spheres of polyvinyl alcohol are generally useful for the same purposes indicated in the previous examples.

Example 5

In this example, dilute sodium polyallyl alcohol xanthate is decausticized and converted to a dry stable powder.

The sodium polyallyl alcohol xanthate used in this example is prepared in accordance with the procedure of B. G. Ranby, described in Die Makromolekulare Chemie, November 1960, p. 68 ff. The sodium polyallyl alcohol xanthate is diluted to a 2% polyallyl alcohol content and purified by dialysis following the procedure described in Example 1. The dialyzed solution is a viscous liquid of pH 11.

The decausticized solution of sodium polyallyl alcohol xanthate is then passed through a horizontal concurrent flow type dryer described and shown in FIG. 7. The solution is atomized into the dryer into a stream of heated air. The air has an inlet temperature of about 163° C. and an outlet temperature of 104° C. Under these conditions the spray is converted to a finely divided powder and recovered in the product collection system.

The sodium polyallyl alcohol xanthate powder is finely divided and consists of hollow spherical particles ranging from submicron size to balloons having diameters of the order of 30 to 60 microns. When the hollow spherical particles of sodium polyallyl alcohol xanthate are treated with dilute acid as described in the previous examples the xanthate is quickly decomposed and regenerated polyallyl alcohol obtained in the form of hollow spherical particles.

As in the previous examples, the operation of the spray dryer may be altered by increasing the air temperature to effect a regeneration of the xanthate in the dryer. If the air temperature is raised to about 240° C. at the inlet and about 120° C. at the outlet the product which is collected from the dryer consists of hollow spherical particles of regenerated polyallyl alcohol of about the same size distribution as described above. These particles have a small amount of alkali and trithiocarbonate present which is removed by a subsequent washing step. The spheres of regenerated polyallyl alcohol are useful for the same purposes indicated for the previously described products.

SPRAY DRYING OF XANTHATE SOLUTIONS DECAUSTICIZED BY CATION EXCHANGE

Viscose and analogous polymeric alcohol xanthates solutions can be purified and reduced in pH by treatment with cation exchange materials in the hydrogen ion or acid form. The free alkali in viscose (and related polymeric alcohol xanthate solutions) and a substantial portion of the combined alkali can be removed by neutralization with a cation exchange material in the hydrogen ion or acid form. In general, the reaction is carried out by merely mixing the viscose (or other xanthate solution) with the cation exchange resin which results in a rapid reaction removing most of the basic impurities.

Reaction which takes place is a simple neutralization reaction, is quite rapid, and seems to be limited only by the rate of diffusion of the alkali into contact with hydrogen ions diffusing from the ion exchange material. While the process is most effective when used with commercially-obtainable, high capacity ion exchange resins, it is effective to a substantial degree with any material having cation exchange properties, which material can be converted to the acid form by treatment with acid. In general, the neutralization of free alkali (and part of the combined alkali) in polymeric alcohol xanthate solutions can be carried out using cation exchange materials in a definite and predetermined manner with the result that the pH of the resulting material can be calculated in advance by an evaluation of the stoichiometry of the reaction.

The following ion exchange materials are illustrative of the cation exchangers which can be used in this process: sulfonated phenolic resins, e.g. Zeo-Karb 215, Zeo-Karb 315, Amberlite IR 1, Amberlite IR 100, Duolite C 10, Duolite C 3, Dowex 30; sulfonated polystyrenes, e.g. Zeo-Karb 225, Amberlite IR 120, Duolite C 20, Dowex 50, and Nalcite HCR; sulfonated coal, e.g. Zeo-Karb H 1; nuclear substituted phosphonate resins, e.g. Duolite C 60 and Duolite C 61; Carboxylic resins, e.g. Zeo-Karb 216, Zeo-Karb 226, Amberlite IRC 50, Duolite CS 100; acid treated zeolites; naturally occuring non-resinous ion exchange materials, e.g. cellulose, wood fibers (bast fiber) including fabricated forms thereof such as webs, papers, fabrics, and the like. The reference to ion exchange resins is intended to be generic to ion exchange material of the high capacity resinous type, to liquid ion exchangers, and to naturally occuring non-resinous materials such as acid treated coal, cellulose wood fibers, fabrics, webs, papers, and the like which are known to have cation exchange properties.

When polymeric alcohol xanthate solutions are treated with ion exchange materials to neutralize free alkali (and sometimes part of the combined alkali) the resulting solution has a pH less than 13 and is capable of being spray dried as will be subsequently described. When a polymeric alcohol xanthate solution is decausticized to a pH less than about 9 some of the combined alkali is removed and the resulting product contains some acid xanthate groups. Consequently, when the product solution or the ultimate spray dried powder is referred to as a polymeric alcohol xanthate, the term is intended to be inclusive of acid xanthates (sometimes referred to as xanthic acid) of the specified polymeric alcohol in which some or all of the combined alkali has been removed.

The following examples are illustrative of the spray drying of xanthate solutions which have been decausticized by cation exchange, to produce hollow spherical particles of regenerated polymeric alcohols or of polymeric alcohol xanthatese which are subsequently converted to regenerated polymeric alcohols.

Example 6

An 8% cellulose content viscose, as used in example, was diluted with distilled water to a 0.5% cellulose content. Amberlite IRC 50H resin beads were added intermittently to the diluted viscose with mechanical stirring over a period of about 10 min. at 25° C. until the pH reached a value of about 8. A clear, light-amber colored liquid resulted. The liquid was filtered through a muslin filter cloth and had a viscosity of 5.1 CP at high shear rates.

The decausticized viscose, prepared as described above, is fed into a spray dryer of the type described and shown in FIG. 1 of the drawings. The solution is atomized into a stream of hot air and rapidly converted into a dry stable powder. The air is supplied to the dryer at an inlet temperature of 144° C. and an outlet temperature of 104° C.

The product obtained from the spray drying operation is substantially dry (moisture content less than about 3%), stable sodium cellulose xanthate (including some xanthic acid groups). The drying operation results in the production of small hollow spheres of sodium cellulose xanthate ranging in size from less than 1 micron up to about 60 microns in diameter (under some drying conditions it is possible to get hollow spheres of much larger size, up to about 500 microns in diameter). If the xanthate solution, either caustic or decausticized, is blown with air or if a volatile solvent or a potential coagulant (e.g. $Na_2SO_4$) is incorporated therein the size of the spherical particles produced in spray drying is markedly increased. The small hollow spheres of sodium cellulose xanthate are treated with dilute acid as described in the previous examples to produce hollow spheres of regenerated cellulose.

The dryer can be altered in its operation to operate at a higher air temperature and thus regenerate hollow spheres of cellulose in the drying step. If the dryer is adjusted to an inlet temperature of about 220° C. and an outlet temperature of about 120° C. the product recovered from the spray dryer consists of small hollow spheres of regenerated cellulose. This product is washed to remove alkali and thiocarbonates and is then redried.

Example 7

In an additional series of experiments, viscose containing higher proportions of cellulose was treated with a cation exchange resin by passing the viscose through a column of resin designed for pressure operation. The column consisted of a 2 in. (O.D.) x 30 in. stainless steel tube provided with end caps having O-ring seals and 100 mesh stainless steel screens backed by 14 mesh screens for supporting the resin bed. In using the column, coarse glass wool was first placed over the screen and the bottom of the column. A portion of Amberlite IRC 50H resin was pretreated with water to prevent excessive compacting of the resin due to swelling on initial wetting. The moist resin was added to the column and tamped to minimize channeling during the ion exchange reaction.

In one experiment the column was partially filled with 150 g. of Amberlite IRC 50H resin, 600 g. of 2% cellulose content viscose was added to the column. The pressure on the column was gradually increased to 30 p.s.i.g. over about 5 min. 600 g. of decausticized viscose was eluted from the column in 3 min. after the pressure reached 30 p.s.i.g. The initial effluent from the column had a pH of 5.5. The final effluent from the column had a pH of about 8.4 which increased to 9.0 after about 4 hours' storage.

In another experiment the column was charged with 100 g. of Amberlite IRC 50H covered with a 0.75 in. layer of Amberlite IRC 50Na. Next, 547 g. of 3% cellulose content viscose was introduced to the column and a pressure of about 60 p.s.i.g. applied. At the end of about 30 minutes, 540 g. of the viscose had been recovered. The initial effluent from the column had a pH of 5.0 which rose to 8.5 after the first 50 ml. The pH of the viscose remained at about 8.5 until completely eluted from the column and gradually increased to a value of 9.8 after about 3 hrs. at 25° C.

In another experiment a column was charged with 100 g. of Amberlite IRC 50H covered with a 0.5 in. layer of Amberlite IRC 50 Na. Then 700 g. of 2.5% cellulose content viscose was added to the column and a pressure of 55 p.s.i.g. applied. The entire 700 g. of viscose was eluted from the column in about 4.5 min. and had a pH of 12.5

In other experiments, dilute viscose solutions (0.5% cellulose content) were passed through the column under gravity feed and under various pressures to produce decausticized viscose solutions of pH varying from 5 to 10.

Decausticized viscose solutions, prepared as just described, are spray dried using the apparatus described and shown in FIG. 1 of the drawings. The viscose solution, in each case, is atomized into a stream of heated air. The air stream has inlet temperature of about 149° C. and an outlet temperature of about 104° C. As previously described, the evaporation of water from the individual droplets of solution maintains the surface temperature of the droplets (and the resulting solid particle) at a temperature not substantially in excess of the wet bulb temperature of the gas stream. The spray drying of the decausticized viscose solutions produces finely divided powders of sodium cellulose xanthate. The powder is a dry (moisture content less than about 3%) stable, solid material in the form of hollow spheres having diameters ranging from submicron size up to 60 microns in diameter.

The hollow spheres of sodium cellulose xanthate which are produced in this manner are treated with acid or are subjected to further heating to regenerate the cellulose. The product which is obtained is regenerated cellulose in the form of hollow spheres of the same size as the cellulose xanthate product. As in the previous examples, the temperature of operation of the spray dryer may be increased to a high enough point, e.g. inlet temperature of about 240° C. and outlet temperature of about 110° C., to effect a complete regeneration of the cellulose in the spray drying step and thus avoiding the necessity of acid treatment.

Example 8

An 8% amylose content solution of sodium amylose xanthate is prepared as described in Example 3 and diluted to a 2% amylose content. This solution is mixed with Amberlite IRC 50H resin to neutralize and decausticize it. The solutions which are recovered have a slight greenish cast but are otherwise similar to decausticized viscose. Decausticized sodium amylose xanthates are produced in this manner at pH values of 10.5, 9.5, 8.7, 8.4 and 7.6. The decausticized sodium amylose xanthate tends to hydrolyze and increases slightly in pH on extended storage. After about 17 hours' storage the increase in pH is only slight and an equilibrium pH of about 10–10.5 is reached after only several days of storage. When sodium amylose xanthate solutions are decausticized to a pH less than 7 the amylose xanthate contains a substantial proportion of its xanthate content in the form of acid xanthate groups.

Decausticized solutions of sodium amylose xanthate prepared as described above are spray dried in the spray dryer described and shown in FIG. 2 of the drawings. The solutions are atomized into a stream of heated air having an inlet temperature of 143° C. and an outlet temperature of 102° C. The product obtained is a dry, stable, decausticized sodium amylose xanthate powder. In the form of very small hollow spheres as in the previous examples.

A similar product is obtained when alkaline sodium amylose xanthate solutions are decausticized with other exchange resins such as Duolite C60, or Zeo-Karb 226 resin in the acid form, followed by spary drying.

When the hollow spheres of spray dried sodium amylose xanthate are subjected to further heating or to treatment with acid to decompose the xanthate the product obtained consists of small hollow spheres of regenerated amylose, as in Example 3. The regenerated amylose spheres can also be obtained by increasing the air temperature in the dryer, as in the previous examples, to a level where the spray dried product is maintained at an elevated temperature for a time sufficient to effect a regeneration of the amylose.

Example 9

A dilute solution of sodium polyvinyl alcohol xanthate is prepared as described in Example 4. This solution is decausticized to a pH of 8.0 by admixture with Amberlite IRC 50H resin in the acid or hydrogen ion form. The decausticized solution is spray dried in the apparatus described and shown in FIG. 2 as described in the previous example. The product is a dry stable powder of sodium polyvinyl alcohol xanthate in the form of small hollow spheres as described in the previous example. The hollow spheres of sodium polyvinyl alcohol xanthate may be converted to regenerated polyvinyl alcohol spheres by further heating or by treatment with acid as previously described. Linewise, the spheres of regenerated polyvinyl alcohol can be obtained by operating the spray dryer at a temperature above the decomposition point of the sodium polyvinyl alcohol xanthate.

Example 10

Sodium polyallyl alcohol xanthate solution is prepared as described in Example 5. The dilute solution is decausticized by admixture with Amberlite IRC 50H exchange resin in the acid or hydrogen ion form. The solution is decausticized to a pH of about 8. The decausticized solution is spray dried in the apparatus described and shown in FIG. 2 of the drawings. The conditions of spray drying are as set forth in the previous example. The product obtained from the dryer is a stable, solid powder of sodium polyallyl xanthate. The product is in the form of small hollow spheres which can be converted to regenerated polyallyl alcohol upon further heating or upon treatment with acid. The regenerated polyallyl alcohol spheres can also be obtained by operating the spray dryer at an elevated temperature as previously described.

SPRAY DRYING OF POLYMERIC ALCOHOL XANTHATE SOLUTIONS DECAUSTICIZED BY ANION EXCHANGE

Viscose and similar polymeric alcohol xanthate solutions can be purified and decausticized by treatment with anion exchange material in a manner somewhat similar to the purification and decausticization using cation exchange resins. In the anion exchange treatment the material used in a strong-base or intermediate-base strength anion exchange resin in the salt form (non-hydroxyl form). When the viscose (or other xanthate) solution is contacted with an anion exchange resin in the salt form, the hydroxyl groups in the solution exchange with the ionizable salt groups on the resin. If the viscose solution is merely mixed with anion exchange resin, the hydroxyl groups from the solution will reach equilibrium with the salt groups ionized from the resin and there will be only a partial purification and decausticization of the solution. However, if the viscose (or other polymeric alcohol xanthate solution) is fed through a column containing the resin, a relatively high ion concentration gradient is maintained between the solution and the resin with the result that a substantially complete removal of hydroxyl ion from the solution is effected.

When an anion exchange resin is used in this manner for decausticizing viscose (or other polymeric alcohol xanthate solutions), it is effective not only to remove hydroxyl ions from the solution but also to remove the anions of contaminating by-products such as trithiocarbomates, mono and dithiocarbonates, thiosulfates, perthiocarbonates and sulfides which are produced as by-products in the xanthation process.

The treatment of viscose and similar solutions with anion exchange resins has the advantage of removing ionic by-products which tend to discolor the viscose but has the disadvantage of substituting the anion of the ion exchange resin for the hydroxyl ions in the solution with the result that the decausticized viscose contains an amount of sodium salts which is substantially equivalent to the alkali content of the viscose as initially formed. As a result, it is necessary to use anion exchange resins only in the form of salts of relatively strong acids so that the salt formed with the sodium ions is substantially neutral. In practice, the anion exchange process is preferably used to clean up a solution which has first been dialyzed or neutralized by cation exchange.

In carrying out the decausticization of polymeric alcohol xanthate solutions with anion exchange materials, any of the commercially available anion exchange resins can be used as well as naturally occurring materials which inherently possess anion exchange properties. Examples of anion exchange materials that can be used in the decausticization of polymeric alcohol xanthate solutions by anion exchange include but are not limited to the following: intermediate base anion exchangers, e.g. Dowex 2; strong base anion exchangers, e.g. De-Acidite FF. Amberlite IRA 400. Amberlite IRA 410, Dowex 1, Nalcite SAR; porous anion exchangers, e.g. Decolorite and Duolite S30, as well as naturally occurring anion exchangers, e.g. proteins containing ionizable amino groups, polymeric betaines, etc.

The following examples are illustrative of the spray drying of polymeric alcohol xanthate solutions which have been decausticized by anion exchange.

Example 11

A glass column having an I.D. of 1 cm. was filled to a depth of 20 cm. with 50 mesh Dowex 1X4 ion exchange resin in the chloride form.

An 8% cellulose content viscose was diluted to 0.5% cellulose content and feed through the column under a pressure of 0.5 p.s.i.g. at a rate of 1 ml./min. The effluent from the column had a substantially constant pH of 11.8 and was a clear, colorless liquid.

This procedure was repeated using the same apparatus filled with Dowex 1X8 resin in the chloride form and the product was a clear liquid having a substantially constant pH of 11.8.

The decausticized viscose produced as just described is fed through a spray dryer as shown and described in FIG. 1 of the drawings. The solution is atomized into a heated air stream having an inlet temperature of 115° C. and an outlet temperature of 60° C. The product obtained is a dry stable almost white powder comprising sodium cellulose xanthate containing a small amount of sodium chloride. The sodium cellulose xanthate product is in the form of hollow spheres of very small size. These hollow spheres of sodium cellulose xanthate may be converted to spheres of regenerated cellulose by further heating or by treatment with acid as described in previous examples. Also, a regenerated cellulose product, in the form of small hollow spheres, can be obtained by operating the dryer at a higher temperature as has been described heretofore.

When dilute viscose was passed through an anion exchange column using other anion exchange resins, including Dowex 2X4 (chloride form), Amberlite IRA 400 (nitrate form), and Nalcite SAR (nitrate form), a decausticized product was obtained as described above.

When the decausticized product is spray dried, the resulting product is a dry stable white powder containing a small amount of a sodium salt impurity resulting from the introduction of the anion from the exchange resin. The anion exchange step is particularly effective in removing colored sulfur by-products. These colored by-products can also be removed by aeration of a cold solution which has been purified or decausticized by dialysis or cation exchange. The product which is obtained from the spray dryer consist of sodium cellulose xanthate in the form of small hollow spheres. These hollow spheres can be converted from the xanthate to regenerated cellulose by further heating or by treatment with acid. Also, hollow spheres of regenerated cellulose can be obtained directly in the spray drying process by operating the spray dryer at a temperature sufficiently high to regenerate the cellulose.

When the above procedure is repeated using solutions of sodium amylose xanthate, sodium polyvinyl alcohol xanthate, or sodium polyallyl alcohol xanthate, the solutions are readily decausticized and can be spray dried as described above. When the solutions are spray dried the products obtained are hollow spheres of the various xanthates. If the spray drying is carried out at a sufficiently high temperature the product obtained is the regenerated polymeric alcohol, e.g. amylose, polyvinyl alcohol, polyallyl alcohol. Also, the spheres of the polymeric alcohol xanthates may be converted to the regenerated polymeric alcohol by treatment with acid or by additional heating.

While the process of preparing hollow spheres of regenerated polymeric alcohol has been described utilizing solutions of polymeric alcohol xanthates which have been decausticized by dialysis or by anion or cation exchange, in preparation for spray drying, other processes of decausticization of the xanthate solutions may be used, particularly as described in D. J. Bridgeford patent application Ser. No. 416,795. In particular, the excess alkali may be removed by ion retardation, by ion exchange using liquid ion exchangers, and by multi-step processes involving more than one of the several processes of dialysis, cation exchange, anion exchange, ion retardation, etc. In each case the solution is decausticized to remove excess alkali prior to spray drying to avoid the depolymerization of the polymeric alcohol which usually results from spray drying a caustic solution. If the spray drying is carried out at conditions which are sufficiently mild to produce hollow spheres of the polymeric alcohol xanthate as the product then the intermediant product of the xanthate is converted to the corresponding regenerated polymeric alcohol, in hollow spherical form, by further heating or by treatment with acid as described in previous examples.

SPRAY DRYING OF VISCOSE AND OTHER CAUSTIC-CONTAINING POLYMERIC ALCOHOL XANTHATE SOLUTIONS

It has been found that viscose and other caustic xanthate solutions such as caustic solutions of sodium amylose xanthate, sodium polyvinyl alcohol xanthate, sodium polyallyl alcohol xanthate, etc., can be spray dried to produce small hollow spheres of the polymeric alcohols in a substantially regenerated form. The small spheres which are obtained are heavily loaded with alkali and with by-products such as thiocarbonates and must be treated with dilute acid to remove such contaminates. The presence of substantial amounts of alkali in the xanthate solution at the time of spray drying also tends to depolymerize the polymeric alcohols and so for a given desired product, one must start with a higher D.P. in the polymeric alcohol xanthate prior to spray drying. The following examples illustrate the spray drying of various caustic xanthate solutions.

Example 12

A 3% cellulose content viscose having a pH of about 14 was spray dried in a spray dryer of the type shown in FIG. 2. The viscose had an initial xanthate content of about 18% based on the cellulose in the solution. The caustic viscose solution was spray dried in an air stream having an inlet temperature of 220° C. and an outlet temperature of 100° C. The product recovered from the spray dryer consisted of small hollow spheres of a very low xanthate content cellulose product. The hollow spheres were of the same general size distribution described in the previous examples and consisted of a sodium cellulose xanthate of a very low D.S. The xanthate sulfur content in this product was about 2%. Thus, there had been almost 90% regeneration of the cellulose during the spray drying process. When the product was mixed with 5% sulfuric acid it was almost immediately converted into hollow spheres of completely regenerated cellulose. After washing and drying, the product can be used for any of the purposes previously described.

Example 13

A commercial viscose solution, ripened, and ready for extrusion, and containing about 8% cellulose and 6.6% total alkali, and having an initial D.P. of about 500 is used in the preparation of cellulose microspheres. The viscose solution is sprayed into a spray dryer of the type shown in FIG. 1 in the drawing utilizing an air inlet temperature of about 250° C. and an air outlet temperature of 110° C. The product which is recovered from the spray dryer consists of hollow microspheres of about the same size distribution as in the previously reported examples. These microspheres consists essentially of regenerated cellulose having a small amount of residual xanthate sulfur. When the microspheres are washed in dilute acid to remove by-product alkali and thiocarbonates and then dried the product obtained consists of substantially pure regenerated cellulose in hollow spherical form.

Example 14

Alkali amylose xanthate solution is prepared as described in Example 3 having a 6% total alkali content and 8% amylose content. The solution is used without removal of caustic. The caustic solution of sodium amylose xanthate is fed into a spray dryer as shown in FIG. 1 of the drawing. The air flow through the dryer is at a rate and temperature such that the inlet temperature is about 240° C. and the outlet temperature about 120° C. The product recovered from the dryer consists of very small hollow spheres having approximately the same size range as described in the previous examples. The hollow spheres consists essentially of regenerated amylose with a small amount of xanthate sulfur and containing by-product alkali and thiocarbonates. The product is washed with dilute acid to remove the alkali and the thiocarbonates and to remove the last of the xanthate sulfur. The product obtained after drying consists of regenerated amylose in hollow spherical form. When other caustic solutions of polymeric alcohol xanthates, such as polyvinyl alcohol xanthate or polyallyl alcohol xanthate are spray dried under the conditions described above, the product which is obtained consists of small hollow spheres of the size distribution described in the previous examples. These hollow spheres are of the regenerated polymeric alcohol containing a small residue of xanthate sulfur together with by-product sodium hydroxide and thiocarbonates. When the product is washed in dilute acid and dried, the finished product consists of small hollow spheres of the corresponding polymeric alcohol.

PROPERTIES AND USES OF POLYMERIC ALCOHOL MICROSPHERES

The hollow spheres of cellulose, amylose, or other polymeric alcohols which are produced in accordance with the above examples range in size from about 0.1 micron up to a maximum of about 500 microns. In most cases, the bulk product obtained in the spray drying operation ranges from about 5 to 20 microns in diameter with some smaller and some larger particles being present. The hollow spheres are often partially fractured and thus are incomplete spheres although many of the spherical particles are obtained intact. The hollow spheres are quite strong and have been subjected to pressures as high as 15,000 p.s.i. in bulk without permanent deformation of the particles. The following examples are illustrative of a number of the microspherical products.

Example 15

When viscose or decausticized cellulose xanthate solution is spray dried as described in the previous examples a microspherical product is obtained as previously described and as indicated by reference numeral 1 in FIG. 3 of the drawings. These cellulose (or other polymeric alcohol) microspheres can be incorporated into a variety of products. When the cellulose microspheres, preferably having a bulk density of less than 0.1, are admixed with paper fibers in a proportion of about 1 to 50% and the mixture formed into a paper sheet, the resulting paper is very light as a result of the hollow spheres which are present therein. The hollow spheres also contribute to the opacity of a very light weight paper made in this manner so that the product can be used for light letter papers, e.g. for airmail, or for publications which require a light weight paper.

Example 16

Figure 9:
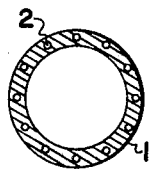
FIG. 9 is an enlarged view in cross section of a hollow spherical particle of regenerated cellulose or the like containing pigment or other particulate material therein.

The cellulose (or other polymeric alcohol) microspheres which are produced as described above may have dye or pigment incorporated therein. In FIG. 9, a microsphere 1 is shown in cross section with particles 2 of a pigment imbedded in the walls thereof. A product of this type was obtained by incorporation of very fine pigments (smaller in size than the wall of the resulting cellulose microsphere) in the viscose or decausticized sodium cellulose xanthate solution prior to spray drying. Pigments which have been used include kaoline, titanium dioxide, carbon black, etc. These pigments or any other pigment of suitable size may be admixed with the viscose or decausticized cellulose xanthate solution prior to spray drying and the slurry spray dried as described above the produce microspheres having a uniform distribution of pigment throughout the walls thereof. The pigmented microspheres have the color produced by the pigment which is incorporated therein. The pigmented microspheres have a greater hiding power and color yield than the corresponding pigments alone. Thus, the pigmented microspheres can be incorporated into viscose in the preparation of color cellophane films. Also, the colored microspheres can be incorporated into lacquer compositions to provide a desired pigmentation. For example, the colored microspheres may be admixed with any paint or ink vehicle to produce the desired color.

A pigment can also be formed in the wall of the microspheres by precipitation. The microspheres have been impregnated with an ammonia sulfate solution and then threated with barium chloride to precipitate barium sulfate both in the walls of the spheres and in the aqueous solution trapped within the hollow interior of spheres. When the spheres are dried the barium sulfate precipitated in the wall and as an internal coating produces a highly opaque product. The microspheres may also be pigmented by treatment with vat dyes or naphthol dyes which are subsequently reacted to precipitate finely dispersed color pigments within the walls of the cellulose. The vat dyes are precipitated as pigments in the walls of the cellulose spheres by the conventional oxidation reduction process. The naphthol dyes are precipitated as pigments within the cellulose walls of the microspheres by the usual coupling reaction. If desired, the microspheres may be dyed by the use of any of the substantive dyes for cellulose or by application of water soluble dyes followed by evaporation of the water. The microspheres have been dyed by treatment with aqueous solutions of FD&C red 4 followed by drying.

Example 17

In this example, the cellulose micropheres are formed with another material present so that the microspheres encapsulate the other material. An oil soluble dye is dispersed into a solution of decausticed sodium cellulose xanthate and the dispersion is spray dried as described in the previous examples. The resulting product consisting of microspheres which are converted to regenerated cellulose by acid treatment. Individual drops of the oil soluble dye are encapsulated in the cellulose spheres. This technique can be used for the encapsulation of any organic or inorganic substances which are normally packaged in a finely divided state by the micro-encapsulation techniques.

Example 18

Aniline is dispersed into a decausticized solution of sodium cellulose xanthate and the dispersion spray dried to produce cellulose microspheres. The microspheres are throughly regenerated by acid treatment and then dried. Individual droplets of aniline are encapsulated in the microspheres and are not easily leached out of their finely encapsulated packages. The microspheres with aniline encapsulated therein are useful as ion exchange beads. Other ion exchange beads can be prepared by encapsulation of other ionic materials in the microspheres. Also, the process may be altered by utilizing a partially carboxylated cellulose in the decausticized viscose composition so that on spray drying the microspheres which are obtained include a small proportion of carboxy groups which will function as ion exchange sites.

Example 19

Cellulose microspheres as described in the previous examples are impregnated with an aqueous solution of aluminum chloride and then dried to give a product consisting of aluminum chloride supported in the wall of the cellulose spheres. The cellulose spheres with aluminum chloride impregnated therein are useful as catalyst in the low temperature isomerization of low molecular weigth hydrocarbons such as butane and pentene. The cellulose microspheres can likewise be used as catalyst supports for any catalyst which is not reactive with the cellulose, to be used in a process where the reactants are not reactive with cellulose.

Example 20

Cellulose microspheres of the type described in Example 18, containing ion exchange groups, are substituted for cellulose fibers and particles used in ion exchange chromatographic separations. These cellulose spheres containing ion exchange groups are substituded in conventional chromatographic apparatus for the cellulose materials which have previously been used therein.

Example 21

Figure 10:
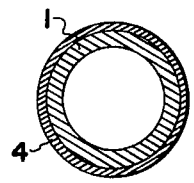
FIG. 10 is an enlarged view in cross section of a hollow spherical particle produced in accordance with this invention and provided with an exterior coating.
Figure 11:
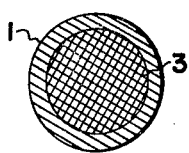
FIG. 11 is an enlarged view in cross section of a hollow spherical particle produced in accordance with this invention and encapsulating on other material.

Cellulose microspheres prepared as described in the previous examples are metalized by a vapor metalization process. The individual spheres with metallic coatings thereon are shown in FIG. 10. The microspheres 1 are provided with coatings 4 of a highly reflective metal which is introduced by a conventional vapor deposition process. Also, metals can be deposited on the surface and in the wall of the microspheres by impregnating the spheres with a reducible metal compound of silver, cupric or cuprite, nickel, platinum, palladium, thallium, etc. salts and then reducing the impregnated salts by reaction with a reducing agent such as sodium dithionite, formaldehyde, etc., to produce mirror surfaces on the particles. The individual particles with metallic mirror surfaces may be admixed with clear lacquer or paint vehicles to apply to surfaces coatings containing the highly reflective particles.

Example 22

Figure 13:
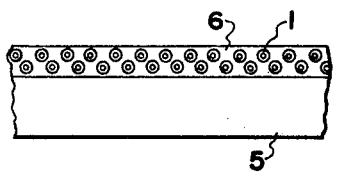
FIG. 13 is a view in cross section of a sheet material such as a film, paper, fabric, or the like, provided with a coating containing hollow spherical particles produced in accordance with this invention.

Cellulose microspheres, either untreated, or pigmented or dyed or coated, are admixed with viscose or with a decausticized sodium cellulose xanthate solution. The resulting slurry comprises a pigmented lacquer which can be applied to the surface of paper, films, fibers, fabrics, etc. to provide novel decorative effects. An example of such a coating is shown in FIG. 13 wherein a substrate 5 is coated with a lacquer vehicle 6, such as viscose or decausticized viscose having a plurality of cellulose microspheres 1 dispersed therein. The lacquer vehicle, e.g. viscose or decausticized viscose, is regenerated to provide a tough adherent coating on the substrate containing the microspheres dispersed therein.

Example 23

Cellulose microspheres of the type described above are heated in an electric furnace to a temperature of about 3,000° C. in a helium atmosphere. As the microspheres are heated, the cellulose is first dehydrated and decomposed to yield hollow spheres of carbon which is then converted to graphite spheres when heated above the graphitization temperature of carbon.

Example 24

Figure 12:
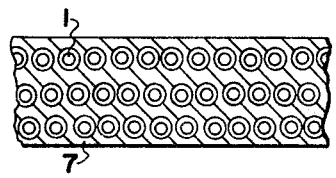
FIG. 12 is a view in cross section of a sheet material, such as a film or paper or fabric, containing hollow spherical particles produced in accordance with this invention as a filler to reduce the bulk density of the product.

Hollow cellulose microspheres are admixed with paper pulp and formed into thick board 7 with the spheres 1 dispersed throughout the board, as shown in FIG. 12. These boards are of extremely low density as the result of the high proportion of microspheres present. These low density boards have exceptionally good insulating properties and are useful as insulating board in building construction.

Example 25

Figure 14:
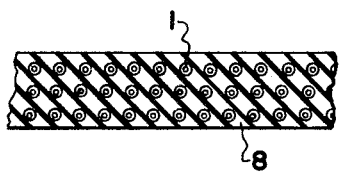
FIG. 14 is a view in cross section of a molded article, which may be a thermal plastic or thermal setting resin, plaster, cement, a fired-clay product, etc., containing hollow spherical particles produced in accordance with this invention, as fillers to reduce bulk density.

Cellulose microspheres are mixed with a thermal plastic or thermal setting material as a filler to produce a product as shown in FIG. 14. A thermal plastic or thermal setting matrix 8 is molded with microspheres 1 dispersed throughout the molded or formed article. The plastic article may be extrusion molded or compression or transfer molded and has the advantage of high strength and low density in the molded product. Also, the microspheres can be admixed with a solution of a polymer and extruded to form a film or fiber which has exceptional properties of low density and/or high opacity. In the way of an example, cellulose microspheres are dispersed into a solution of polyacrylonitrile in dimethylsulfoxide and the slurry extruded through a spinnerette and solvent removed to produce a modified acrylic fiber.

Example 26

Cellulose microspheres prepared as described above were wetted and compressed into a sheet under a pressure of about 5,000 p.s.i. and dried. The sheet which was thus prepared was rigid and strong and can be used as an insulating board.

Example 27

Cellulose microspheres pigmented with titanium dioxide or with kaoline as described above are admixed with a starch adhesive and applied in a very thin layer to extremely thin writing papers. The pigmented layer is very adherent to the paper and provides a high degree of opacity for a very light weight paper. The treated paper is especially useful as an air mail writing paper or as a paper for printed publications where reduction in weight is an important consideration.

Example 28

Cellulose microspheres are applied as a uniform layer over the surface of the liquid in a petroleum storage tank to retard evaporation. The spheres are quite effective in reducing evaporation losses.

While this invention has been described with special emphasis upon several preferred embodiments of the process for preparing small hollow spheres of polymeric alcohols such as cellulose, amylose etc., and describes a variety of uses and applications for these novel products, it will be apparent to those skilled in the art that other methods of preparation and other uses are contemplated. For example, hollow spheres of amylose, polyvinyl alcohol, or polyallyl alcohol may also be prepared by spray drying solutions of these polymers (i.e. ones having a D.P. at which they are soluble) or by spray drying solutions of the corresponding alcoholates (e.g. alkali amylose, etc.) followed by acid washing the spherical particles. For the various uses described above, the spheres of cellulose, amylose, etc. are equivalent. However, in any of the uses where low water sensitivity is required the spheres, particularly the ones of amylose, polyvinyl alcohol and polyallyl alcohol, may require a treatment to cross-link the polymer. Finally, it should be understood that within the scope of the appended claims this invention may be practiced otherwise than as specifically described herein.

What is claimed is:

1. A method of preparing small substantially alkali-free hollow spheres of a polymeric alcohol having a diameter in the range from less than 1 micron to about 500 microns which comprises spray drying a solution of a polymeric alcohol xanthate which has been decausticized by dialysis or ion exchange to produce hollow spherical particles and treating the particles to decompose substantially all of the xanthate functional groups therein.

2. A method as defined in claim 1 in which the decomposition of the xanthate groups is complete in the spray drying of the solution.

3. A method as defined in claim 1 in which the spherical particles are treated with an acid wash to remove byproducts and decompose any remaining xanthate functional groups.

4. A method as defined in claim 3 in which the polymeric alcohol is cellulose, amylose, polyvinyl alcohol or polyallyl alcohol.

5. A method as defined in claim 4 in which the xanthate solution is spray dried at a temperature sufficient to effect a substantially complete decomposition of the xanthate groups.

References Cited

UNITED STATES PATENTS

| | | | |
|---|---|---|---|
| 2,797,139 | 6/1957 | Veatch. | |
| 2,797,141 | 6/1957 | Veatch. | |
| 2,465,343 | 3/1949 | Battista | 106—168 |
| 2,593,786 | 4/1952 | O'Neill et al. | 106—168 |
| 2,722,528 | 11/1955 | Johnson | 106—198 |
| 2,740,723 | 4/1956 | Voris | 106—198 |
| 2,843,583 | 7/1958 | Voris | 106—198 |

ALLAN LIEBERMAN, Primary Examiner

U.S. Cl. X.R.

106—168, 198; 260—41, 91.3, 9, 212, 218, 233